United States Patent
Onishi et al.

(10) Patent No.: US 7,225,726 B2
(45) Date of Patent: Jun. 5, 2007

(54) PISTON FOR AUTOMATIC TRANSMISSION

(75) Inventors: Hirofumi Onishi, Aichi-gun (JP); Yuji Yasuda, Nishikamo-gun (JP); Tatsuo Kirai, Naruto (JP); Masafumi Masuda, Tokushima (JP); Kouji Oomae, Naruto (JP)

(73) Assignees: Toyota Jidosha Kabushiki Kaisha, Toyota-shi (JP); Koyo Sealing Techno Kabushiki Kaisha, Itano-gun (JP)

( * ) Notice: Subject to any disclaimer, the term of this patent is extended or adjusted under 35 U.S.C. 154(b) by 0 days.

(21) Appl. No.: 11/293,295

(22) Filed: Dec. 5, 2005

(65) Prior Publication Data

US 2006/0117948 A1    Jun. 8, 2006

(30) Foreign Application Priority Data

Dec. 6, 2004   (JP) .............................. 2004-353422
Apr. 15, 2005  (JP) .............................. 2005-118168

(51) Int. Cl.
  *F16D 25/0638*   (2006.01)
  *F16D 25/00*     (2006.01)

(52) U.S. Cl. .................................. 92/255; 192/85 AA (58) Field of Classification Search ................. 92/255; 192/45.91, 48.8, 89.2, 85 AA
See application file for complete search history.

(56) References Cited

U.S. PATENT DOCUMENTS

| 6,513,636 B2 * | 2/2003 | Han et al. ............... 192/85 AA |
| 6,523,657 B1 * | 2/2003 | Kundermann et al. ..... 192/48.8 |
| 6,702,081 B2 * | 3/2004 | Gorman et al. ........... 192/52.2 |
| 2002/0007997 A1 | 1/2002 | Kundermann et al. |
| 2005/0000774 A1 * | 1/2005 | Friedmann ................ 192/48.8 |

FOREIGN PATENT DOCUMENTS

| DE | 100 20 262 A1 | 11/2000 |
| JP | 9-32919 | 2/1997 |
| JP | 09032919 A * | 2/1997 |

OTHER PUBLICATIONS

Patent Abstracts of Japan, JP 09-032919, Feb. 7, 1997, (referance previously filed in Japanese language on Dec. 5, 2005.

* cited by examiner

*Primary Examiner*—Thomas E. Lazo
(74) *Attorney, Agent, or Firm*—Oblon, Spivak, McClelland, Maier & Neustadt, P.C.

(57) ABSTRACT

A piston for an automatic transmission, including a first piston member forming a cylindrical portion and a second piston member forming a bottom portion, wherein the first piston member has a plurality of engaging grooves formed in one of opposite axial end portions thereof, each of the engaging grooves having a radial surface extending in a radial direction of the first piston member, and the second piston member has a plurality of elongate claws (70) extending in a circumferential direction thereof and respectively corresponding to the engaging grooves, each elongate claw having a free end portion and a fixed end portion, and being bent in an axial direction of the second piston member such that the free end portion is spaced from the fixed end portion in the axial direction toward an open end of the piston, each elongate claw having a first engaging lug which is formed at the free end portion and which is held in engagement with the corresponding engaging groove and in pressing contact with the radial end face of the corresponding engaging groove.

9 Claims, 7 Drawing Sheets

PISTON FOR AUTOMATIC TRANSMISSION

The present application is based on Japanese Patent Application No. 2005-118168 filed Apr. 15, 2004, the contents of which are incorporated herein by reference.

BACKGROUND OF THE INVENTION

1. Field of the Invention

The present invention relates in general to a piston operable to force frictional coupling elements of a clutch or brake provided in an automatic transmission, against each other to place the clutch or brake in its engaged state.

2. Discussion of the Related Art

A known automatic transmission includes clutches and brakes each of which is provided with frictional coupling elements in the form of a plurality of friction plates, so that the automatic transmission is automatically shifted by selectively engaging and releasing the clutches and brakes. The frictional coupling elements are forced against each other by a piston, to place each clutch or brake in its engaged state. JP-9-32919A discloses an example of such a piston, which consists of two members, namely, a first piston member forming a cylindrical portion of the piston, and a second piston member forming a bottom portion of the piston. In this piston disclosed in JP-9-32919A, the first piston member (cylindrical portion) has cutouts, while the second piston member (bottom portion) has engaging portions fitted in the cutouts, so that the first and second piston members are fixed to each other into the piston, with a retainer ring.

Where the piston is constituted by the first piston member forming the cylindrical portion and the second piston member forming the bottom portion, which are fixed to each other with a retainer ring or the like, a small gap inevitably exists in the axial direction of the piston, between the first and second piston members fixed together with the retainer ring, due to axial dimensional errors within a predetermined tolerance, so that the first and second piston members are undesirably movable relative to each other in the axial direction of the piston, in the presence of the above-indicated gap. Accordingly, the first piston member tends to have an axial rattling movement, giving rise to a risk of unnecessary abutting contact of the first piston member with the outermost one of the frictional coupling elements, which may cause unnecessary mutual frictional contact of the frictional coupling elements, leading to so-called "dragging" of the clutch or brake, and consequent deterioration of durability of the piston and the frictional coupling elements, and an increase in power loss of the automatic transmission due to the dragging.

SUMMARY OF THE INVENTION

The present invention was made in the light of the background art discussed above. It is therefore an object of the present invention to provide a piston for an automatic transmission, which includes a cylindrical portion formed by a first piston member and a bottom portion formed by a second piston member and which has improved durability and operating efficiency and assures improved durability of frictional coupling elements and improved power transmitting efficiency of the automatic transmission.

The objected indicated above may be achieved according to any one of the following modes of the present invention, each of which is numbered like the appended claims and depends from the other mode or modes, where appropriate, to indicate and clarify possible combinations of elements or technical features. It is to be understood that the present invention is not limited to the technical features or any combination thereof which will be described for illustrative purpose only.

(1) A piston for an automatic transmission, comprising a first piston member forming a cylindrical portion and a second piston member forming a bottom portion, the piston being characterized in that: the first piston member has a plurality of engaging grooves formed in one of opposite axial end portions thereof, each of the engaging grooves having a radial surface extending in a radial direction of the first piston member; the second piston member has a plurality of elongate claws which extend in a circumferential direction thereof and which respectively correspond to the plurality of engaging grooves; and each of the plurality of elongate claws has a free end portion and a fixed end portion, and is bent in an axial direction of the second piston member such that the free end portion is spaced from the fixed end portion in the axial direction toward an open end of the piston, each elongate claw having a first engaging lug which is formed at the free end portion and which is held in engagement with a corresponding one of the engaging grooves and in pressing contact with the radial end face of the corresponding engaging groove.

The piston according to the above-described mode (1) of the present invention is constructed such that each of the elongate claws of the second piston member is bent in the axial direction of the second piston member such that the free end portion of the claw is spaced from the fixed end portion of the claw in the axial direction of the second piston member toward the open end of the piston, so that the first engaging lug formed at the free end portion of the claw is held in pressing contact with the radial surface of the corresponding engaging groove in the axial direction of the second piston member, under an elastic force of the claw, whereby the first piston member is biased by the claw in the axial direction, with a result of reduction of a rattling movement of the first piston member relative to the second piston member in the axial direction. This arrangement is effective to prevent an unnecessary contact of the first piston member with a set of frictional coupling elements, making it possible to improve the durability and operating efficiency of the piston, the durability of the frictional coupling elements, and the power transmitting efficiency of the automatic transmission. In addition, each of the elongate claws having an elastic force in the axial direction can be easily given a relatively large length since it is formed so as to extend in the circumferential direction of the second piston member, so that the amount of stress acting on the elongate claw can be reduced, so that the durability of the elongate claws can be further improved. Further, an ordinary steel plate rather than a spring steel plate can be used to form the second piston member, so that the cost of manufacture of the piston can be reduced.

(2) The piston according to the above-described mode (1), wherein the first piston member has a circumferential groove formed in an inner circumferential surface of the above-indicated one of opposite axial end portions, the piston further comprising a retainer ring which is fitted in a radially outer portion thereof in the circumferential groove, for fixing the first and second piston members together.

(3) The piston according to the above-described mode (2), wherein the second piston member has a plurality of recessed portions formed in a radially outer portion thereof which overlaps with a radially inner portion of the retainer ring, each of the plurality of recessed portions having a recess to prevent a contact thereof with the retainer ring.

In the piston according to the above-described mode (3), the second piston member has the recessed portions in its radially outer portion overlapping the radially inner portion of the retainer ring. In this arrangement, there exists a gap between the retainer ring and the second piston member in the axial direction, even when the retainer ring and the second piston member are forced against each other in the other portions of the retainer ring and second piston member, upon operation of the piston. Accordingly, a stress concentration in the radially outer portion of the second piston member is reduced, and the durability of the piston is improved.

(4) The piston according to the above-described mode (3), wherein the plurality of recessed portions are respectively formed in the free end portions of the plurality of elongate claws.

(5) The piston according to any one of the above-described modes (1)–(4), wherein the second piston member has a plurality of arcuate cutouts formed in the radially outer portion thereof such that the arcuate cutouts extend in the circumferential direction and partially define the plurality of elongate claws, respectively.

(6) The piston according to the above-described mode (5), wherein the plurality of arcuate cutouts are equally spaced apart from each other in the circumferential direction of the second piston member, whereby the plurality of elongate claws are equally spaced apart from each other in the circumferential direction.

(7) The piston according to any one of the above-described modes (1)–(6), wherein the second piston member has a plurality of second engaging lugs extending from an outer circumferential surface thereof in a radially outward direction thereof, the plurality of first engaging lugs and the plurality of second engaging lugs are alternately arranged in the circumferential direction of the second piston member.

(8) The piston according to the above-described mode (7), wherein the second piston member has a first set of engaging grooves consisting of the above-described plurality of engaging grooves with which the first engaging lugs are held in engagement, and a second set of engaging grooves with which the second engaging lugs are held in engagement.

(9) The piston according to any one of the above-described modes (1)–(8), which is operated to selectively place a clutch device of the automatic transmission in an engaged state and a released state thereof.

BRIEF DESCRIPTION OF THE DRAWINGS

The above and other objects, features, advantages and technical and industrial significance of the present invention will be better understood by reading the following detailed description of preferred embodiments of this invention, when considered in connection with the accompanying drawings, in which.

DETAILED DESCRIPTION OF THE PREFERRED EMBODIMENTS

Figure 1:
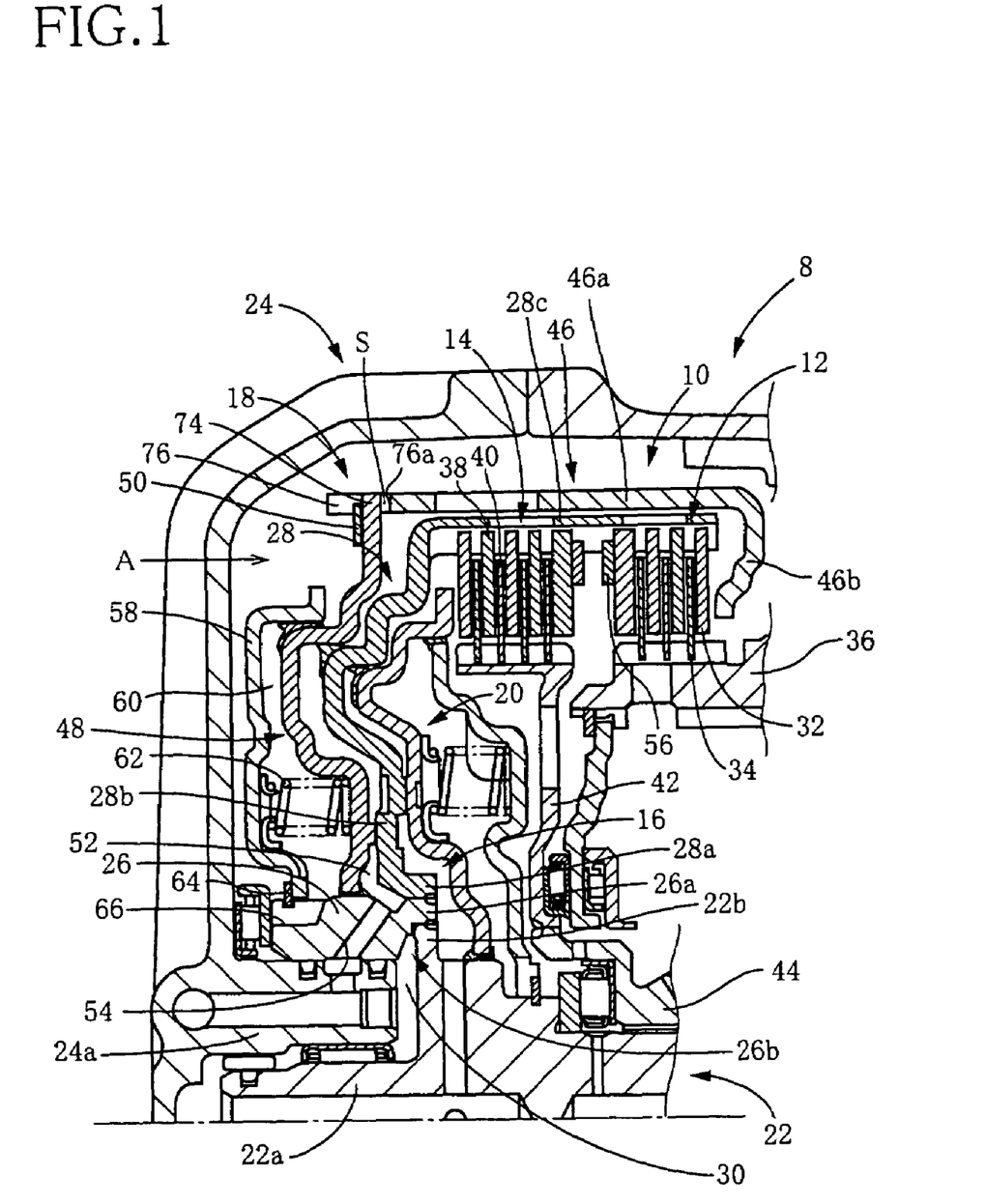
FIG. 1 is a fragmentary side elevational view in cross section of an automatic transmission which is provided a clutch device including a piston in the form of a radially outer piston constructed according to a first embodiment of this invention.

Referring first to the side elevational view in cross section of FIG. 1, there is shown a part of an automatic transmission 8 which is provided with a clutch device 10 including a piston in the form of a radially outer piston 18 constructed according to one embodiment of this invention.

The clutch device 10 is of a double clutch construction, and includes: a clutch drum 16 supporting a first set of frictional coupling elements 12 and a second set of frictional coupling elements 14; the above-indicated radially outer piston 18 disposed radially outwardly of the clutch drum 16 so as to cover the clutch drum 16; and a radially inner piston 20 disposed radially inwardly of the clutch drum 16.

The automatic transmission 8 has a casing 24, and an input shaft 22 which is rotatably supported at its end portion 22a by the casing 24. The input shaft 22 has a flange portion 22b which is located at an axial position near the end portion 22a. The flange portion 22b extends radially outwardly perpendicularly to the axis of the input shaft 22. The input shaft 22 is a turbine shaft of a torque converter driven by a drive power source such as an engine of an automotive vehicle.

The clutch drum 16 consists of a radially inner drum 26 and a radially outer drum 28. The radially inner drum 26 is a generally cylindrical member which has a substantially constant outside diameter and which is fitted on an axially extending cylindrical portion 24a of the casing 24. The radially inner drum 26 includes a thin-walled axial end portion 26a on the side of the radially inner piston 20. The inner circumferential surface of the radially inner drum 26 has a tapered and stepped portion 26b which is adjacent to the axial end portion 26a. The tapered part of the tapered and stepped portion 26b has an inside diameter which increases in an axial direction of the inner drum 26 toward the thin-walled axial end portion 26a. The axial end portion 26a has an end face which is flush with one of opposite surfaces of the flange portion 22b of the input shaft 22 which is on the side of the radially inner piston 20. The radially inner drum 26 and the input shaft 22 are welded to each other at the outer circumferential surface of the flange portion 22b and the inner circumferential surface of the axial end portion 26a. The flange portion 22b of the input shaft 22 and the tapered and stepped portion 26b of the axial end portion 26a of the radially inner drum 26 cooperate to partially define an oil sump 30, which is formed radially inwardly of the tapered and stepped portion 26b.

The radially outer drum 28 is a cylindrical member consisting of an inner cylindrical portion 28a, an outer cylindrical portion 28c, and an annular bottom portion 28b which connects the corresponding axial ends of the inner and outer cylindrical portions 28a, 28c. The radially outer drum 28 is closed at its one axial end by the annular bottom portion 28b and is open at the other axial end.

The inner cylindrical portion 28a is fitted on the thin-walled axial end portion 26a of the radially inner drum 26, and the end face of the inner cylindrical portion 28a which is on the side of the radially inner piston 20 is flush with the corresponding end face of the axial end portion 26a. The radially outer and inner drums 26, 28 are welded to each other at the inner circumferential surface of the inner cylindrical portion 28a and the outer circumferential surface of the axial end portion 26a. Accordingly, the radially outer drum 28 as well as the radially inner drum 26 is rotated with the input shaft 22.

The annular bottom portion 28b of the radially outer drum 28 extends generally in the radial direction of the input shaft 22, and is connected at its radially inner end to the axial end of the inner cylindrical portion 28a which is on the side of the radially outer clutch piston 18. The outer cylindrical portion 28c extends from the radially outer end of the annular bottom portion 28b in the axial direction (in the right direction as seen in FIG. 1). The outer cylindrical portion 28c holds a plurality of inwardly extending friction plates 32 of the first set of frictional coupling elements 12, and a plurality of inwardly extending friction plates 38 of the second set of frictional coupling elements 14, such that the friction plates 32 are splined to a portion of the inner circumferential surface of the outer cylindrical portion 28c, which portion is relatively near the axial open end of the outer cylindrical portion 28c, and such that the friction plates 38 are splined to a portion of the inner circumferential surface which is relatively near the annular bottom portion 28b and relatively remote from the above-indicated axial open end. The friction plates 32, 38 extend from the inner circumferential surface of the outer cylindrical portion 28c in the radially inward direction of the clutch drum 16. The first set of frictional coupling elements 12 consist of the above-indicated inwardly extending friction plates 32 and a plurality of outwardly extending friction plates 34, which are alternately arranged in the axial direction of the clutch drum 16. Similarly, the second set of frictional coupling elements 14 consist of the above-indicated inwardly extending friction plates 38 and a plurality of outwardly extending friction plates 40, which are alternately arranged in the axial direction.

The outwardly extending friction plates 34 of the first set of frictional coupling elements 12 are splined to the outer circumferential surface of a ring gear 36 of the automatic transmission 8 which functions as a clutch hub. The outwardly extending friction plates 40 of the second set of frictional coupling elements 14 are splined to the outer circumferential surface of a clutch hub 42. The clutch hub 42 is fixedly fitted at its inner circumferential surface on a sun gear 44 which is fixedly fitted on the input shaft 22, so that the clutch hub 42 is rotated with the sun gear 44.

The radially outer piston 18 consists of: a first piston member 46 which is disposed radially outwardly of the outer cylindrical portion 28c of the radially outer drum 28 and which forms a cylindrical portion of the piston 18; an annular second piston member 48 which engages one of the opposite axial end portions of the first piston member 46 and which forms a bottom portion of the piston 18; and a retainer ring 50 which is fixed to the above-indicated one axial end portion of the first piston member 46 and which is provided to prevent removal of the second piston member 48 from the first piston member 46. The retainer ring 50 is fitted at its radially outer portion in a circumferential groove (not shown) formed in the inner circumferential surface of the first piston member 46.

The second piston member 48 of the radially outer piston 18 is axially slidable at its inner circumferential surface on the radially inner drum 26. The second piston member 48 and the annular bottom portion 28b of the radially outer drum 28 cooperate to define a first hydraulic pressure chamber 52 to which a working oil is fed through an oil passage 54 formed through the radially inner drum 26, so that the radially outer piston 18 is axially movable such that the second piston member 48 is moved away from the bottom portion 28b of the radially outer drum 28.

On one of opposite axial sides of the second piston member 48 which is remote from the first hydraulic pressure chamber 52, there is disposed a balancer 58 such that the balancer 58 is fitted at its inner circumferential surface on the outer circumferential surface of the radially inner drum 26. The balancer 58 cooperates with the second piston member 48 of the radially outer piston 18 to define a second hydraulic pressure chamber 60. A return spring 62 is interposed between the balancer 58 and the second piston member 48, to bias the balancer 58 and second piston member 48 in opposite axial directions away from each other. The axial position of the balancer 58 biased by the return spring 62 in the axial direction away from the radially outer piston 18 is determined by abutting contact of the balancer 58 at its radially inner end portion with a retainer ring 64 fixed to the outer circumferential surface of the radially inner drum 26.

The radially inner drum 26 has an oil passage (not shown) for communication between the second hydraulic pressure chamber 60 and the oil sump 30, so that the working oil is introduced into the second hydraulic pressure chamber 60 through this oil passage. Accordingly, the second hydraulic pressure chamber 60 functions as a canceling chamber for canceling a centrifugal hydraulic pressure developed in the first hydraulic pressure chamber 52. The working oil is discharged from the second hydraulic pressure chamber 60 into a space on the axial side of the balancer 58 remote from the second hydraulic pressure chamber 60, through an axial groove 66 formed through an axial portion of the radially inner drum 26 on which the balancer 58 is fitted.

The first piston member 46 of the radially outer piston 18 is formed by pressing, and consists of a cylindrical portion 48a disposed radially outwardly of the outer cylindrical portion 28c of the radially outer drum 28, and a presser portion 46b formed to extend from one axial end of the cylindrical portion 46a which is remote from the second piston member 48. The presser portion 46b extends generally in the radially inward direction and is inclined in the axial direction toward the first set of frictional coupling elements 12, such that the radially inner end of the presser portion 46b is opposed to the nearest friction plate 32 of the first set of frictional coupling elements 12. When the first hydraulic pressure chamber 52 is not supplied with the pressurized working oil, there is left a small amount of clearance between the radially inner end of the presser portion 46b and the above-indicated nearest friction plate 32. The outer cylindrical portion 28c of the radially outer drum 28 has a retainer ring 56 fixed to its inner circumferential surface to prevent an axial movement of the first set of frictional coupling elements 12 toward the second set of frictional coupling elements 14.

Figure 2A:
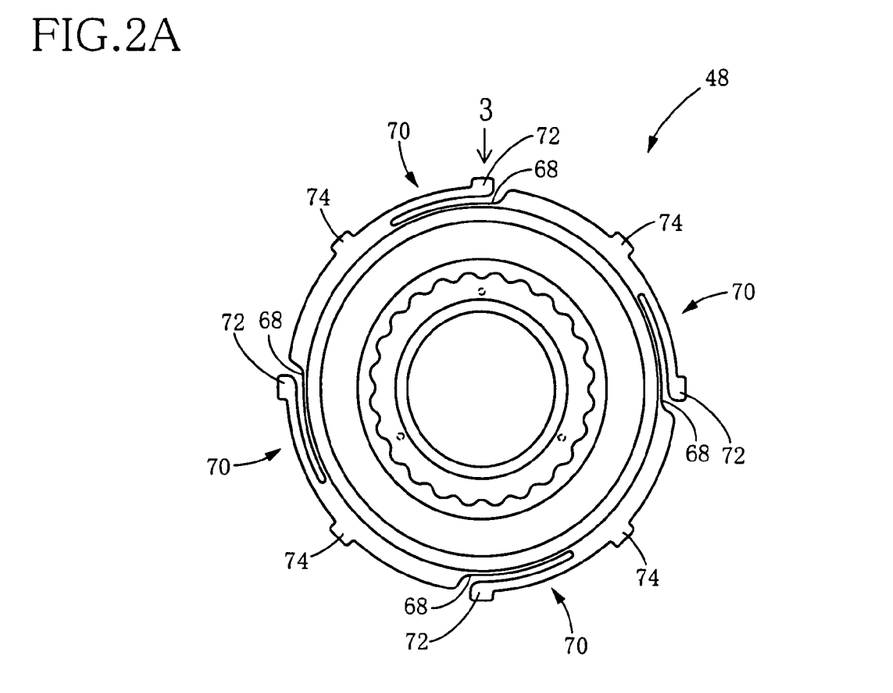
FIG. 2A is a front elevational view of a second piston member of the radially outer piston, taken in a direction of arrow-headed line A of FIG. 1.
Figure 2B:
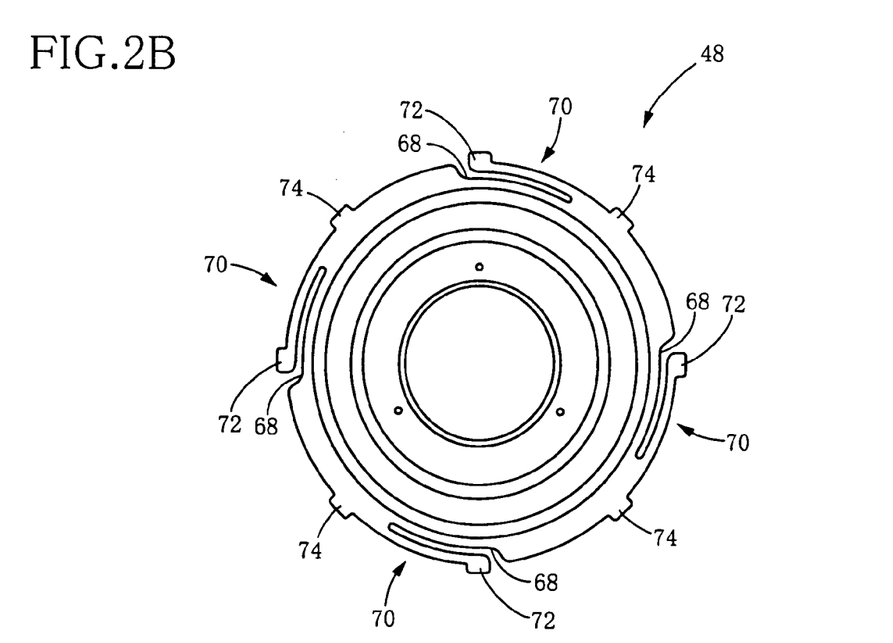
FIG. 2B is a rear elevational view of the second piston member taken in a direction opposite to the direction of the arrow-headed line A.

The second piston member 48 of the radially outer piston 18 will be described in detail, by reference to the front elevational view of FIG. 2A taken in the direction of arrow-headed line A of FIG. 1, and the rear elevational view of FIG. 2B taken in the direction opposite to the direction of the arrow-headed line A. As shown in FIGS. 2A and 2B, the second piston member 48 has a plurality of arcuate cutouts 68, more precisely, four arcuate cutouts 68 formed through a radially outer portion thereof such that each cutout 68 extends in the circumferential direction of the second piston member 48 and is open in the outer circumferential surface of the second piston member 48. The four cutouts 68 are equally spaced apart from each other in the circumferential direction of the second piston member 48. In the presence of the four cutouts 68, the second piston member 48 has four elongate arcuate claws 70 extending in its circumferential direction and located outwardly of the cutouts 68 in the radial direction of the second piston member 48. The four elongate arcuate claws 70 are equally spaced apart from each other in the circumferential direction of the second piston member 48.

Each of the four elongate arcuate claws 70 has a first engaging lug 72, which is formed at its free or distal end portion so as to extend in the radial direction of the second piston member 48. The second piston member 48 has four second engaging lugs 74 each formed intermediate between the adjacent two elongate arcuate claws 70, such that the four second engaging lugs 74 are equally spaced apart from each other in the circumferential direction of the second piston member 48, and such that each lug 74 extends in the radial direction of the second piston member 48, like the first engaging lug 72. The second piston member 48 of the radially outer piston 18 is also formed by pressing.

Referring back to FIG. 1, the cylindrical portion 46a of the first piston member 46 has engaging grooves in the form of eight axial grooves 76 formed in one of its opposite axial end portions which is remote from the presser portion 46b, that is, at its axial end portion at which the first piston member 46 is fixed to the second piston member 48. The axial grooves 76 are formed through the thickness of the cylindrical portion 46a in its radial direction. The axial grooves 76 extend in the axial direction of the cylindrical portion 46a. The first and second engaging lugs 72, 74 are held in engagement with the respective eight axial grooves 76. It is noted that FIG. 1 shows one of the second engaging lugs 74 which is held in engagement with the corresponding one of the eight axial grooves 76. As shown in FIG. 1, the axially inner end of each axial groove 76, which is opposite to the axially outer open end of the axial groove 76, is defined by a radial surface 76a. Due to dimensional errors of the first and second piston members 46, 48 within predetermined tolerances, there exists a small gap S between the radial surface 76a and the second engaging lug 74. Accordingly, the first piston member 46 is axially movable relative to the second piston member 48, by a distance corresponding to the gap S.

Figure 3:
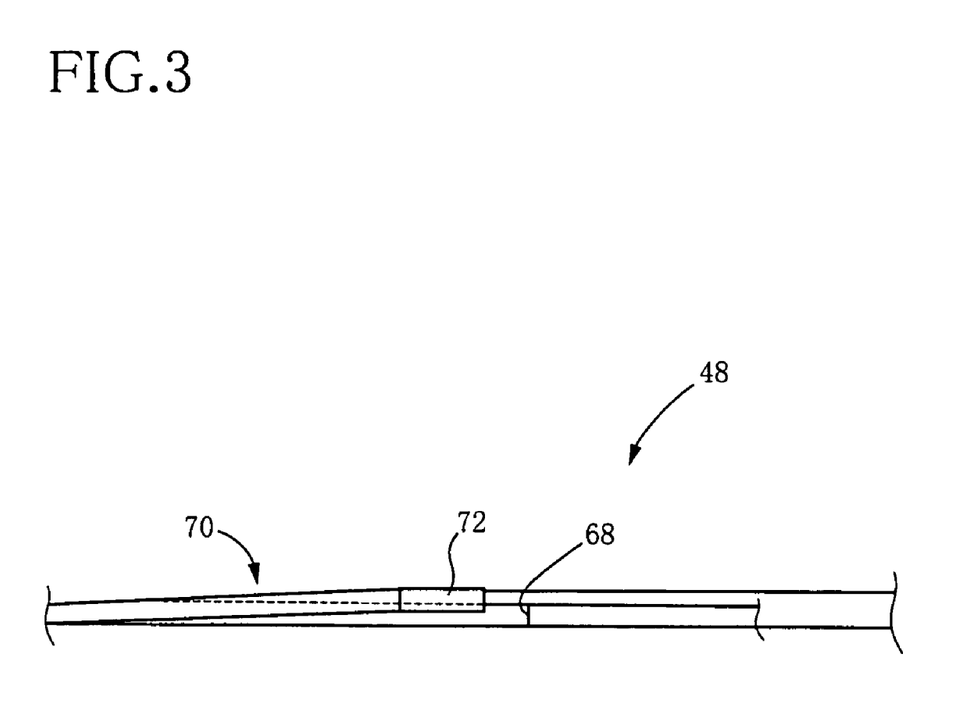
FIG. 3 is a view taken in a direction of arrow-headed line 3 of FIG. 2A.

As shown in FIG. 3 which is a view taken in the direction of arrow-headed line 3 of FIG. 2A, each elongate arcuate claw 70 is inclined or bent in the axial direction of the second piston member 48 toward the presser portion 46b of the first piston member 46, namely, toward the open end of the radially outer piston 18, such that the free or distal end portion of the claw 70 is spaced from the fixed or proximal end portion in the axial direction of the second piston member 48 toward the open end of the radially outer piston 18. Accordingly, the thus bent elongate arcuate claw 70 is held at its first engaging lug 72 in pressing contact with the radial surface 76a of the axial groove 76 in the axial direction of the second piston member 48, under an elastic force of the claw 70 while the retainer ring 50 is held in abutting contact with the second piston member 48, as described below in detail by reference to FIG. 4. The angle of inclination or bending of the elongate arcuate claw 70 under a non-load state of the second piston member 48 is determined so that a spacing distance between the free and fixed end portions of the claw 70 in the axial direction of the second piston member 48 is larger than the above-indicated gap S.

Figure 4:
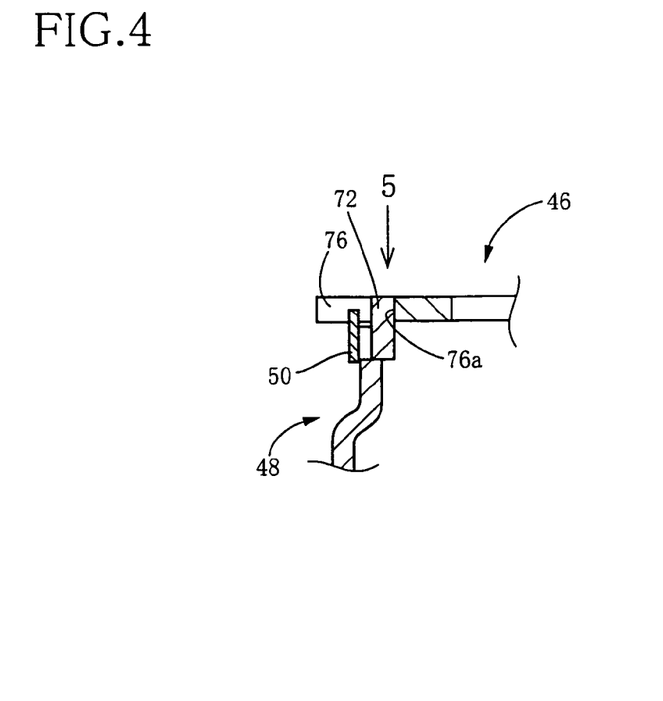
FIG. 4 is a cross sectional view showing a first engaging lug engaging an engaging groove of a first piston member of the radially outer piston.
Figure 5:
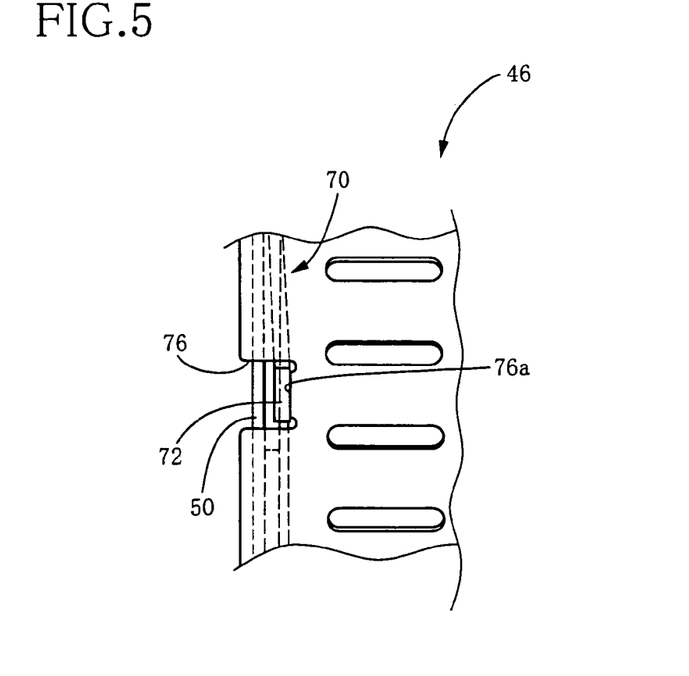
FIG. 5 is a view taken in a direction of arrow-headed line 5 of FIG. 4.

Referring to the cross sectional view of FIG. 4, there is shown one of the first engaging lugs 72 of the second piston member 48 held in engagement with the corresponding axial groove 76 of the first piston member 46. FIG. 4 is a view taken in the direction of arrow-headed line 5 of FIG. 4. As shown in FIGS. 4 and 5, the first engaging lug 72 is held at one of its opposite side faces in pressing contact with the radial surface 76a of the corresponding axial groove 76, in the presence of the retainer ring 50 which is held in abutting contact with one of opposite surfaces of the second piston member 48 which is remote from the above-indicated one side face of the lug 72. As indicated above, the spacing distance between the free and fixed end portions of the elongate arcuate claw 70 in the axial direction of the second piston member 48 is larger than the above-indicated gap S under the non-load state of the second piston member 48, so that the first piston member 46 is biased by the claw 70 in the axial direction.

As described above, the radially outer piston 18 of the present embodiment of the invention is constructed such that each of the elongate arcuate claws 70 of the second piston member 48 is inclined or bent in the axial direction of the second piston member 48 such that the free end portion of the claw 70 is spaced from the fixed end portion of the claw 70 in the axial direction of the second piston member 48 toward the open end of the piston 18, so that the first engaging lug 72 formed at the free end portion of the claw 70 is held in pressing contact with the radial surface 76a of the corresponding axial groove 76 in the axial direction of the second piston member 48, under the elastic force of the claw 70, whereby the first piston member 46 is biased by the claw 70 in the axial direction, with a result of reduction of a rattling movement of the first piston member 46 relative to the second piston member 48 in the axial direction. This arrangement is effective to prevent an unnecessary contact of the first piston member 46 with the first set of frictional coupling elements 12, making it possible to improve the durability and operating efficiency of the radially outer piston 18, the durability of the first set of frictional coupling elements 12, and the power transmitting efficiency of the automatic transmission 8.

In addition, each of the four arcuate claws 70 having an elastic force in the axial direction can be easily given a relatively large length since it is formed so as to extend in the circumferential direction of the second piston member 48, so that the amount of stress acting on the claw 70 would be made smaller than that acting on each second engaging lug 74 if this lug 74 were bent in the axial direction of the second piston member 48 to bias the first piston member 46 in the axial direction. Accordingly, the durability of the claws 70 can be further improved. Further, an ordinary steel plate rather than a spring steel plate can be used to form the second piston member 48, so that the cost of manufacture of the radially outer piston 18 can be reduced.

There will next be described a second embodiment of this invention. In the second embodiment, the same reference signs as used in the first embodiment will be used to identify the functionally corresponding elements.

Figure 6:
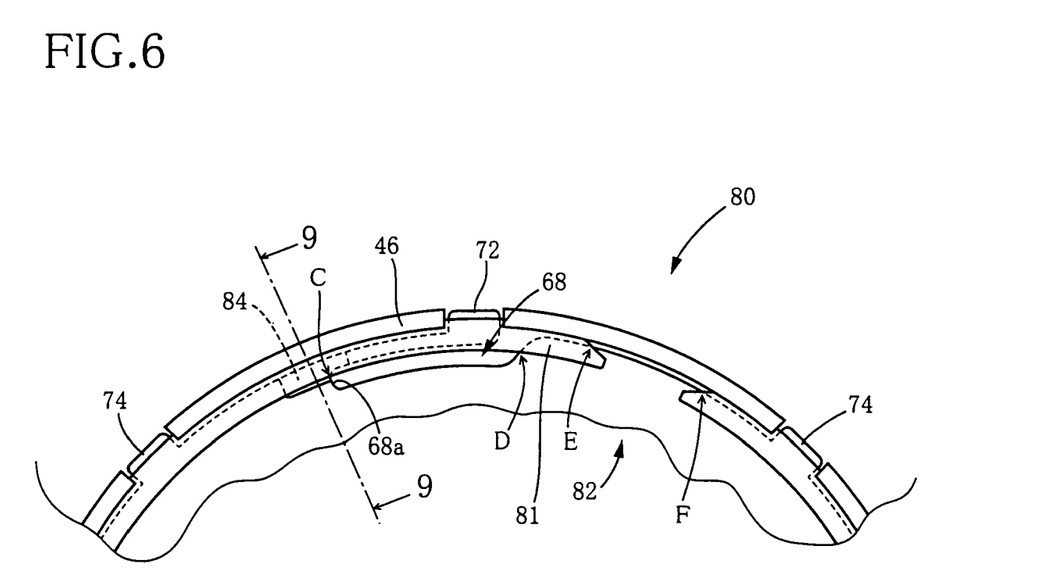
FIG. 6 is a fragmentary view of a radially outer piston according to a second embodiment of this invention, which view is taken in the same direction as the direction of the arrow-headed line A of FIG. 1.

Referring to FIG. 6 which is a view of a radially outer piston 80 of the second embodiment taken in the same direction as the direction of arrow-headed line A of FIG. 1. This radially outer piston 80 consists of the same first piston member 46 as used in the first embodiment, a retainer ring 81, and a second piston member 82 which is different from the second piston member 48 in the first embodiment.

The radially outer piston 80 of the second embodiment is different from the radially outer piston 18 of the first embodiment, only in the construction of the second piston member 82. Referring to the enlarged fragmentary view of FIG. 7 and the view of FIG. 8 taken in the direction of arrow-headed line 8 of FIG. 7, the second piston member 82 is different from the second piston member 48 of the first embodiment only in that the second piston member 82 has a stepped portion 84 formed in the fixed or proximal end portion of each of the four elongate arcuate claws 70.

The stepped portion 84 functions as a recessed portion. As shown in FIG. 8, this stepped portion 84 is formed by forming a recess in one of opposite surfaces of the second piston member 82 which is on the side of the retainer ring 81 (namely, on the lower side of the second piston member 82 as seen in FIG. 8). The stepped portion 84 is formed when the second piston member 82 is formed by pressing. Accordingly, the cost of manufacture of the second piston member 82 is the same as that of the second piston member 48 of the first embodiment. Line B—B in FIGS. 7 and 8 indicates a position at which the elongate arcuate claw 70 is bent in the axial direction of the second piston member 82.

Figure 7:
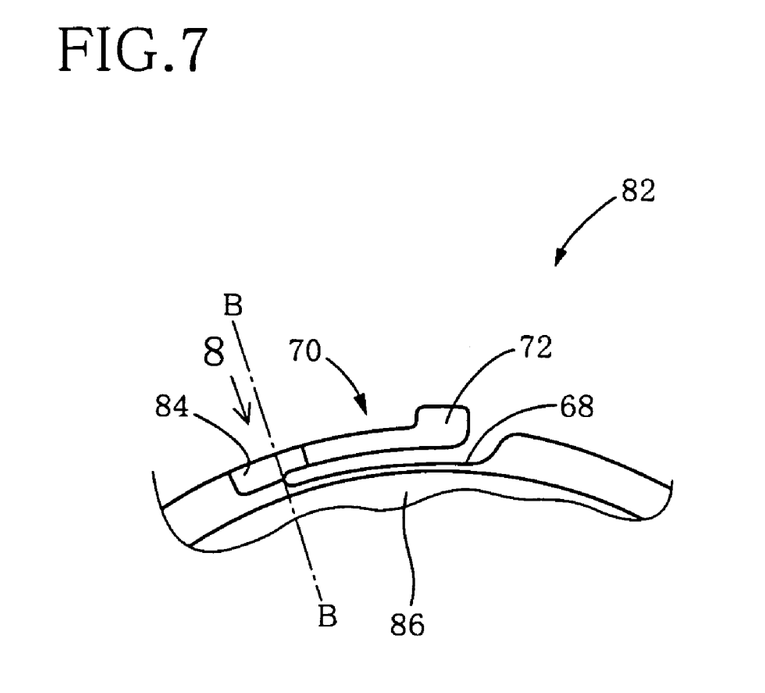
FIG. 7 is an enlarged fragmentary view of the radially outer piston of the second embodiment.
Figure 8:
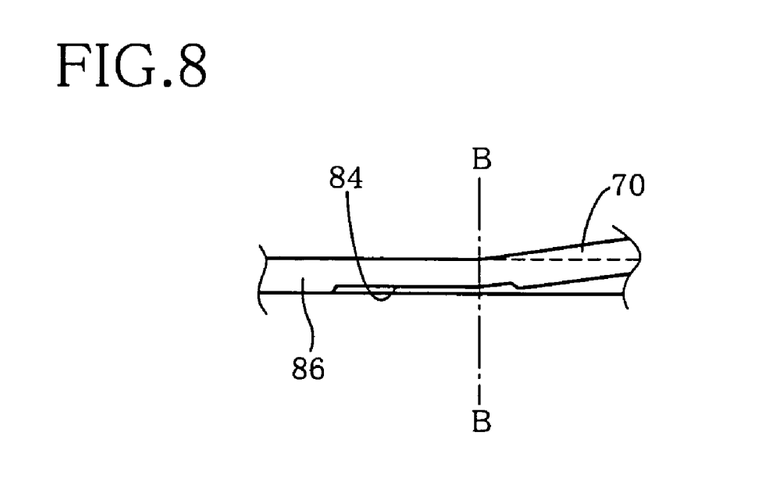
FIG. 8 is a view taken in a direction of arrow-headed line 8 of FIG. 7.

As shown in FIG. 7, the stepped portion 84 is formed at the fixed end portion of the claw 70, which is located adjacent to the closed end of the arcuate cutout 68 indicated by the line B—B (position at which the claw 70 is bent). Described in detail, the stepped portion 84 consists of a first part on one side of the line B—B which is nearer to the first engaging lug 72 in the circumferential direction of the second piston member 82, and a second part on the other side of the line B—B which is remote from the first engaging lug 72. The second part has a larger dimension in the radial direction of the second piston member 82, than the first part, so that the radial dimension of the second part partially overlaps with the radial dimension of the cutout 68. In other words, the second part of the stepped portion 84 is partially formed in a circular main body portion 86 of the second piston member 82. The main body portion 86 excludes the claws 70 and the second engaging lugs 74.

Figure 9:
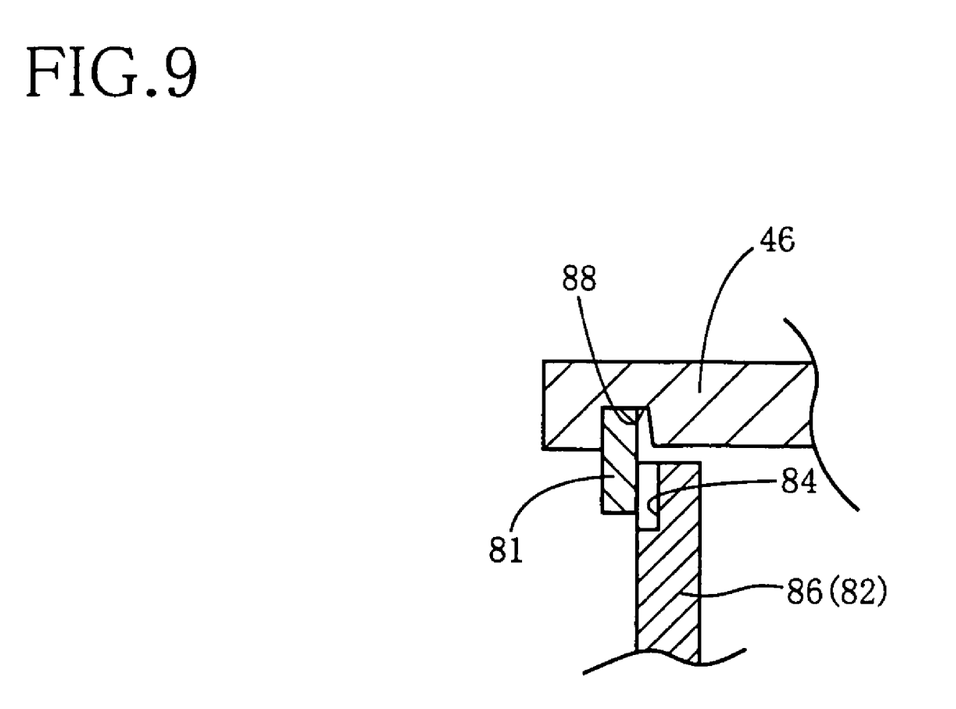
FIG. 9 is a cross sectional view taken along line 9—9 of FIG. 6.

Referring to the cross sectional view of FIG. 9 taken along line 9—9 of FIG. 6, the cylindrical portion 46a of the first piston member 46 has a circumferential groove 88 formed in the inner circumferential surface of its axial end portion at which the first piston member 46 is fixed to the second piston member 82. The retainer ring 81 is partially fitted in the circumferential groove 88. In the presence of the stepped portions 84 of the claws 70, there exists a gap between the retainer ring 81 and the main body portion 86, in the axial direction of the piston 90, in the circumferential portions of the second piston member 82 corresponding to the stepped portions 84, as shown in FIG. 9. In the other circumferential portions of the second piston member 82 in which the stepped portions 84 are not formed, the retainer ring 56 is held in contact with the main body portion 86. When the radially outer piston 82 is operated with the pressurized working fluid introduced into the first hydraulic pressure chamber 52, the main body portion 86 is axially moved toward the retainer ring 81, so that the main body portion 86 and the retainer ring 81 are forced against each other.

Referring back to FIG. 6, the closed end of each arcuate cutout 68 is defined by a curved end surface 68a which is located between the opposite ends of the stepped portion 84 in the circumferential direction of the second piston member 82. The inner circumferential surface of the retainer ring 81 is located within the dimension of the curved end surface 68a in the radial direction of the second piston member 82. In other words, the inner circumferential surface of the retainer ring 81 indicated at point C in FIG. 6 is located between two opposite arcuate surfaces which define the arcuate cutout 68 in the radial direction of the second piston member 82. Accordingly, the above-indicated second part of the stepped portion 84 which is remote from the first engaging lug 72 consists of inner and outer areas which are respectively located inwardly and outwardly of the point C (inner circumferential surface of the retainer ring 81) in the radial direction of the second piston member 82. Thus, the stepped portion 84 is formed in the radially outer portion of the second piston member 82 which overlaps the radially inner portion of the retainer ring 81. It is noted that the point C is a point of intersection between the inner circumference of the retainer ring 81 and the curved end surface 68a of the arcuate cutout 68.

In the first embodiment wherein the second piston member 48 does not have the stepped portions 84, the second piston member 48 and the retainer ring 50 are held in contact with each other even at the point C, so that a stress concentration takes place at the point C when the radially outer piston 18 is operated.

In the second embodiment, on the other hand, the second piston member 82 has the stepped portion 84 which is recessed to prevent its contact with the retainer ring 81, in an area of the second piston member 82 which includes and which is located near the point C lying on the inner circumferential surface of the retainer ring 81, which is located within the dimension of the curved end surface 68a of each elongate arcuate cutout 68 in the radial direction of the second piston member 82. In this arrangement, there exists a gap between the retainer ring 81 and the second piston member 82 in the axial direction, at the point C, even when the retainer ring 81 and the second piston member 82 are forced against each other in the other areas of the second piston member 82, upon operation of the radially outer piston 80. Accordingly, the stress concentration at the point C is smaller in the second embodiment than in the first embodiment, so that the durability of the second piston member 80 is improved.

While the preferred embodiments of the present invention have been described above in detail by reference to the accompanying drawings, for illustrative purpose only, it is to be understood that the present invention may be embodied otherwise.

While the radially outer piston 18, 80 according to the illustrated embodiments is used for the clutch device 10 incorporated in the automatic transmission 8, the piston of the present invention may be used for a brake device incorporated in an automatic transmission.

In the illustrated embodiments, the second piston member 48, 82 has the four elongate arcuate claws 70 equally spaced apart from each other in its circumferential direction, the number of the claws 70 is not limited to four, but may be selected as desired, provided at least two arcuate claws 70 are provided such that the claws 70 are symmetrical with each other with respect to the axis of the radially outer piston.

In the second embodiment, each stepped portion 84 is open in the outer circumferential surface of the second piston member 82, as shown in FIGS. 6, 7 and 9, the stepped portion 84 need not be open in the outer circumferential surface of the second piston member 82, provided the stepped portion 84 has an area which is located outwardly of the point C in the radial direction of the second piston member 82. Further, the dimension of the stepped portion 84 in the circumferential direction of the second piston member 82 may be smaller than that in the second embodiment, provided the stepped portion 84 consists of two parts located on the respective opposite sides of the point C (curved end surface 68a) in the circumferential direction of the second piston member 82.

In the second embodiment, the stepped portions 84 are formed by forming respective recesses in respective local portions of the surface of the second piston member 82 facing the retainer ring 81, such that those local portions have a smaller wall thickness than the other local portions. However, stepped portions may be formed in the second piston member having a constant wall thickness, by bending respective local portions of the second piston member, such that the local portions are recessed to prevent their contact with the retainer ring 81.

Although the second piston member 82 has the recessed portions in the form of the stepped portions 84 having a constant depth, the recessed portions are not limited to the stepped portions, but may take any other configuration, such as recesses having a curved bottom surface.

The retainer ring 81 and the second piston member 82 overlap with each other in the radial direction and therefore contact with each other, also at points D, E and F indicated in FIG. 6, so that a stress concentration takes place at this points D, E and F. To avoid this stress concentration, the second piston member 82 may have recessed portions at those points D, E, F as well as at the point C, to prevent its contact with the retainer ring 81, for thereby improving the durability of the radially outer piston 80. These recessed portions are also formed so as to partially overlap with the retainer ring in the radial direction, such that each recessed portion consists of an area located outwardly of the inner circumference of the retainer ring 81 in the radial direction of the second piston member 82, and an area located inwardly of the inner circumference of the retainer ring 81.

It is to be understood that the present invention may be embodied with various other changes, modifications and improvements which may occur to those skilled in the art, in the light of the foregoing teachings.

What is claimed is:

1. A piston for an automatic transmission, comprising a first piston member forming a cylindrical portion and a second piston member forming a bottom portion, wherein an improvement comprises:

said first piston member having a plurality of engaging grooves formed in one of opposite axial end portions thereof, each of said engaging grooves having a radial surface extending in a radial direction of said first piston member;

said second piston member having a plurality of elongate claws which extend in a circumferential direction thereof and which respectively correspond to said plurality of engaging grooves; and each of said plurality of elongate claws having a free end portion and a fixed end portion, and is bent in an axial direction of said second piston member such that said free end portion is spaced from said fixed end portion in said axial direction toward an open end of said piston, said each elongate claw having a first engaging lug which is formed at said free end portion and which is held in engagement with a corresponding one of said engaging grooves and in pressing contact with said radial surface of said corresponding engaging groove.

2. The piston according to claim 1, wherein said first piston member has a circumferential groove formed in an inner circumferential surface of said one of opposite axial end portions, said piston further comprising a retainer ring which is fitted in a radially outer portion thereof in said circumferential groove, for fixing said first and second piston members together.

3. The piston according to claim 2, wherein said second piston member has a plurality of recessed portions formed in a radially outer portion thereof which overlaps with a radially inner portion of said retainer ring, each of said plurality of recessed portions having a recess to prevent a contact thereof with said retainer ring.

4. The piston according to claim 3, wherein said plurality of recessed portions are respectively formed in the fixed end portions of said plurality of elongate claws.

5. The piston according to claim 1, wherein said second piston member has a plurality of arcuate cutouts formed in said radially outer portion thereof such that said arcuate cutouts extend in said circumferential direction and partially define said plurality of elongate claws, respectively.

6. The piston according to claim 5, wherein said plurality of arcuate cutouts are equally spaced apart from each other in said circumferential direction of said second piston member, whereby said plurality of elongate claws are equally spaced apart from each other in said circumferential direction.

7. The piston according to claim 1, wherein said second piston member has a plurality of second engaging lugs extending from an outer circumferential surface thereof in a radially outward direction thereof, said plurality of first engaging lugs and said plurality of second engaging lugs are alternately arranged in said circumferential direction of the second piston member.

8. The piston according to claim 7, wherein said second piston member has a first set of engaging grooves consisting of said plurality of engaging grooves with which said first engaging lugs are held in engagement, and a second set of engaging grooves with which said second engaging lugs are held in engagement.

9. The piston according to claim 1, which is operated to selectively place a clutch device of said automatic transmission in an engaged state and a released state thereof.

* * * * *